US011924628B1

(12) United States Patent
Marrin

(10) Patent No.: US 11,924,628 B1
(45) Date of Patent: Mar. 5, 2024

(54) VIRTUAL SURROUND SOUND PROCESS FOR LOUDSPEAKER SYSTEMS

(71) Applicant: HEAR360 INC., Los Angeles, CA (US)

(72) Inventor: Matthew Marrin, Los Angeles, CA (US)

(73) Assignee: HEAR360 INC, Los Angeles, CA (US)

( * ) Notice: Subject to any disclaimer, the term of this patent is extended or adjusted under 35 U.S.C. 154(b) by 110 days.

(21) Appl. No.: 17/545,457

(22) Filed: Dec. 8, 2021

Related U.S. Application Data

(60) Provisional application No. 63/123,300, filed on Dec. 9, 2020.

(51) Int. Cl.
*H04S 7/00* (2006.01)

(52) U.S. Cl.
CPC .......... *H04S 7/303* (2013.01); *H04S 2400/01* (2013.01); *H04S 2420/01* (2013.01)

(58) Field of Classification Search
None
See application file for complete search history.

(56) References Cited

U.S. PATENT DOCUMENTS 6,078,669 A * 6/2000 Maher ..................... H04S 1/002 381/63
6,804,361 B2 * 10/2004 Hosoi ..................... H04S 3/008 381/99
2002/0186854 A1 * 12/2002 Hosoi ..................... H04S 3/008 381/98
2007/0133831 A1 * 6/2007 Kim .......................... H04S 3/02 381/313
2007/0165868 A1 * 7/2007 Klayman ................ H04S 3/008 381/119
2009/0103737 A1 * 4/2009 Kim .......................... H04S 3/00 381/17
2012/0213375 A1 * 8/2012 Mahabub ................. H04S 5/00 381/17
2015/0172812 A1 * 6/2015 Wu .......................... H04R 3/12 381/71.1
2018/0035235 A1 * 2/2018 Funakoshi ................ H04S 7/30
2018/0192226 A1 * 7/2018 Woelfl ................... H04R 5/033
2018/0279064 A1 * 9/2018 Chon ...................... H04S 7/302

* cited by examiner

*Primary Examiner* — Qin Zhu
(74) *Attorney, Agent, or Firm* — patenttm.us

(57) ABSTRACT

The present invention relates to a device and a computerized process for creating a virtual surround sound process for loudspeakers systems, which can create an immersive sound experience with a minimal number of loudspeakers from a less immersive sound source. This computerized process is embodied by software that can be used to process a traditional mono, stereo, or multi-channel audio input to create additional audio channels which are then processed by virtualization filters, and finally summed together with the original input source and output to a loudspeaker system, where a listener will experience a more immersive virtual surround sound experience when compared to listening to only the original source. It should be further noted that the software can be customized for each loudspeaker system for optimal calibration and sonic performance.

14 Claims, 6 Drawing Sheets

VIRTUAL SURROUND SOUND PROCESS FOR LOUDSPEAKER SYSTEMS

CROSS-REFERENCE TO RELATED APPLICATIONS

This application claims benefit of U.S. Provisional Patent Application Ser. 63/123,300, filed Dec. 9, 2020.

BACKGROUND OF THE INVENTION

1. Field of the Invention

The present invention relates generally to a virtual surround sound process for loudspeaker systems.

2. Background

Currently there are a number of minimal, or stereo only loudspeaker solutions for playing back surround sound content without the use of additional speakers dedicated to reproducing the surround sound channel information. Some of these solutions attempt to deliver the intended experience that a true multi-speaker surround sound loudspeaker can provide, but these solutions fail to meet the needs of the industry because they simply sum all of the surround sound channel information and play all of the channels back over a single stereo loudspeaker system, which diminishes most of the original spatial positional information of the audio content being reproduced for the listener. Other solutions attempt to create a virtualized surround sound speaker reproduction by using only a stereo loudspeaker configuration along with a combination of digital signal processing techniques and phase manipulation, but these solutions are similarly unable to meet the needs of the industry due to the tonal coloration and sonic degradation that are introduced by the DSP techniques. Still other solutions seek to create a virtualized surround sound speaker reproduction by using only a stereo loudspeaker configuration along with a combination of digital signal processing techniques, but these solutions also fail to meet industry needs because when only a stereo or non-surround sound audio source is available, the virtual surround sound process does not work because it is only capable of processing multichannel surround sound channel information that is not available or present in a stereo only or non-surround sound audio source.

It would be desirable to have a computerized process for creating a virtual surround sound experience that can be created from a traditional mono, or stereo audio source. Furthermore, it would also be desirable to have a computerized process that creates a virtual surround sound experience over a traditional loudspeaker system, eliminating the need to add many additional speakers to create a similar surround sound effect. Still further, it would be desirable to have a computerized process for creating a virtual surround sound experience that can be calibrated specifically for its target loudspeaker system, optimizing the sound experience for the listener. Therefore, there currently exists a need in the industry for a process that creates a virtual surround sound process for traditional, non-surround sound loudspeaker systems.

SUMMARY OF THE INVENTION

The present invention advantageously fills the aforementioned deficiencies by providing a virtual surround sound process for loudspeaker systems which provides an immersive sound experience with a minimal number of loudspeakers from a less immersive sound source. This computerized process is embodied by software that can be used to process a traditional mono, stereo, or multi-channel audio input to create additional audio channels which are then processed by virtualization filters, and finally summed together with the original input source and output to a loudspeaker system, where a listener will experience a more immersive virtual surround sound experience when compared to listening to only the original source. It should be further noted that the software can be customized for each loudspeaker system for optimal calibration and sonic performance. The present invention is a computerized process for creating an enhanced virtual surround sound playback for loudspeaker systems, using only a standard stereo audio file or source. This computer process is made up of the following executable steps:

- Step 1: A stereo audio source with "Left" and "Right" information is passed into the input of the virtualization software.
- Step 2: The stereo audio signal is passed through a Mid-Side decode processing block to extract center image information from the stereo sound-field.
- Step 3: The extracted center image information is processed with a High Pass filter to subtract low frequency information, and then routed to an output audio path labeled "Center (C)".
- Step 4: The extracted center image information is duplicated, processed with a Low Pass filter to subtract mid and high frequency information, and then routed to output paths "Left (L)" and "Right (R)".
- Step 5: The Side information extracted from the Mid-Side decode processing block is routed to output paths "Left (L)" and "Right (R)".
- Step 6: A duplicate of the Side information extracted from the Mid-Side decode processing block is processed by a High Pass filter to remove low frequency information, and then split into a left side and a right side, where the left side is processed by an audio delay block set to a very short delay, less than 100 milliseconds, at which both left and right signals are then routed to output paths "Left Surround Rear (LSR)" and "Right Surround Rear (RSR)".
- Step 7: A duplicate of the Left and Right input audio source is created, processed by a Band Pass filter to extract both high and low frequencies, leaving only the middle frequencies present, at which the processed Left and Right duplicate signals are then routed to output paths labeled "Left Side Surround (LSS)" and "Right Side Surround (RSS)".
- Step 8: Another duplicate of the Left and Right input audio source is created, summed to create a single mono audio source, processed by a Low Pass filter to remove middle and high frequency information, and then routed to an output path labeled "Low Frequency Effects (LFE)"
- Step 9: Another duplicate of the Left and Right input audio source is created, split into left and right channels, and then each routed into a separate convolution engine, each processed by an impulse response with room reflections, processed by a filter for tonal equalization, and then routed to output paths labeled "Left Top Surround (LTS)" and "Right Top Surround (RTS)"
- Step 10: The (L) output path is connected to "Processing Bus A".
- Step 11: The (R) output path is connected to "Processing Bus B".

Step 12: The (C) output path is connected to "Processing Bus A" and "Processing Bus B"

Step 13: The (LFE) output path is connected to "Processing Bus A" and "Processing Bus B"

Step 14: The (LSR) output path is connected to a convolution engine, processed by an HRTF filter with an externally controllable azimuth and elevation (impulse response), connected to crosstalk cancelation processing block with an externally controllable loudspeaker width, and then connected to "Processing Bus A".

Step 15: The (RSR) output path is connected to a convolution engine, processed by an HRTF filter with an externally controllable azimuth and elevation (impulse response), connected to crosstalk cancelation processing block with an externally controllable loudspeaker width, and then connected to "Processing Bus B".

Step 16: The (LSS) output path is connected to a convolution engine, processed by an HRTF filter with an externally controllable azimuth and elevation (impulse response), connected to crosstalk cancelation processing block with an externally controllable loudspeaker width, and then connected to "Processing Bus A".

Step 17: The (RSS) output path is connected to a convolution engine, processed by an HRTF filter with an externally controllable azimuth and elevation (impulse response), connected to crosstalk cancelation processing block with an externally controllable loudspeaker width, and then connected to "Processing Bus B".

Step 18: The (TSL) output path is connected to a convolution engine, processed by an HRTF filter with an externally controllable azimuth and elevation (impulse response), connected to crosstalk cancelation processing block with an externally controllable loudspeaker width, and then connected to "Processing Bus A".

Step 19: The (TSR) output path is connected to a convolution engine, processed by an HRTF filter with an externally controllable azimuth and elevation (impulse response), connected to crosstalk cancelation processing block with an externally controllable loudspeaker width, and then connected to "Processing Bus B".

Step 20: Processing Bus A is connected to an equalization and dynamic control processing block, and then connected to a Left Loudspeaker.

Step 21: Processing Bus B is connected to an equalization and dynamic control processing block, and then connected to a Right Loudspeaker.

The present invention may also have one or more of the following optional executable steps: Alternate Step 1A: A mono input source can be used instead of a stereo input source, but will first be sent to a virtual stereo synthesis processing block where a virtualized stereo signal will be created before proceeding to Step 1.

Alternate Step 1B: A multichannel surround sound input sources such as 5.1, 7.1, 3.0, 4.0, or any other surround sound format can also be accepted as an input source, where by all following steps that derive new information from the L and R input channels of the multichannel surround sound input source will continue as already described, but any channels that are already present in the multichannel surround source will take precedence over and cancel out any of the virtualized versions of those channels. For example, if the input source is 5.1 and includes Left, Right, Center, LFE, LSR, and RSR channel information, then the Center channel from the input source will be used for the C output path instead of the virtualized C created from the Mid Side Decode process. The same rule applies for Left, Right, LFE, LSR, and RSR channels from the input source. In this example, only the newly created LSS, RSS, TLS, and TRS channels will be used from the virtualization process and be mixed in to the loudspeaker system along with the original multichannel source channel information. All HRTF and Crosstalk cancelation processes remain as described in the original steps.

Additional Options 1: equalization, gain control, dynamic control, and any other digital signal processing blocks can be added to any of the steps, and controlled by a user interface for loudspeaker optimization and customization.

Additional Options 2: Additional speakers can be added to the stereo loudspeaker system to create an expanded surround sound system. For example, a LSR, RSR, and LFE speaker can be added to the loudspeaker system, and if added, any source channel or virtualized channel path that is meant to be mapped to a virtualized path representing that speaker position will be routed directly to the additional speaker that has been added, bypassing all HRTF and crosstalk cancelation processing blocks. In this case, only the virtualized channels that do not have their own dedicated speakers will continue to be processed as described in the main processing steps 1-21, and Alternate Step 1A and Alternate Step 1B.

The software of the present invention is unique when compared with other known solutions in that it provides a solution for representing both non-surround sound format audio sources and multi-channel surround sound source audio sources as immersive surround sound experiences over a traditional stereo only non-surround sound loudspeaker system.

The present invention software is unique when compared with other software solutions in that is incorporates a process that ensures a uniformity in the delivered sound experience, by its capability to represent multichannel surround sound audio content, and non-surround sound audio content over traditional loudspeakers systems, maintaining a high quality sound experience with consistent characteristics in playback experience regardless of the original audio source format.

Among other things, it is an object of the present invention to provide a virtual surround sound process for loudspeaker systems that does not suffer from any of the problems or deficiencies associated with prior solutions.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
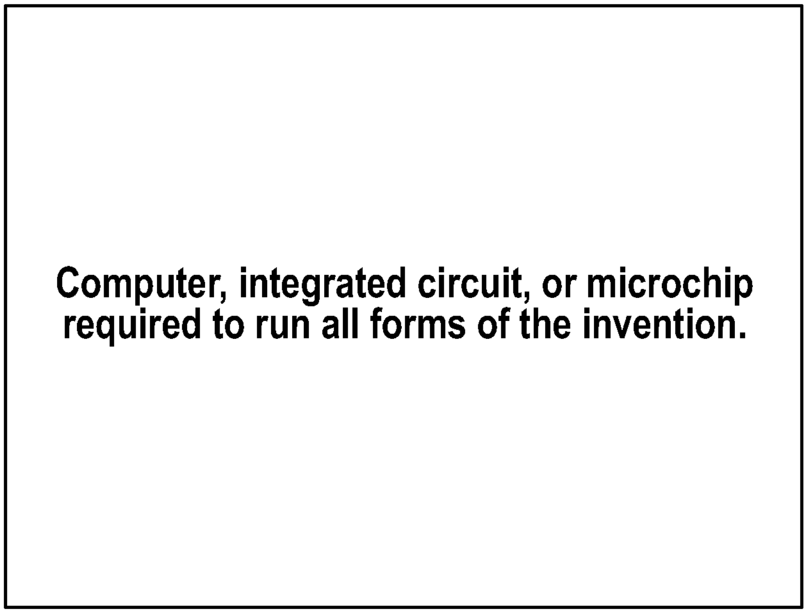
FIG. 1 shows a Computer, integrated circuit, or microchip required to run all forms of the invention.
Figure 2:
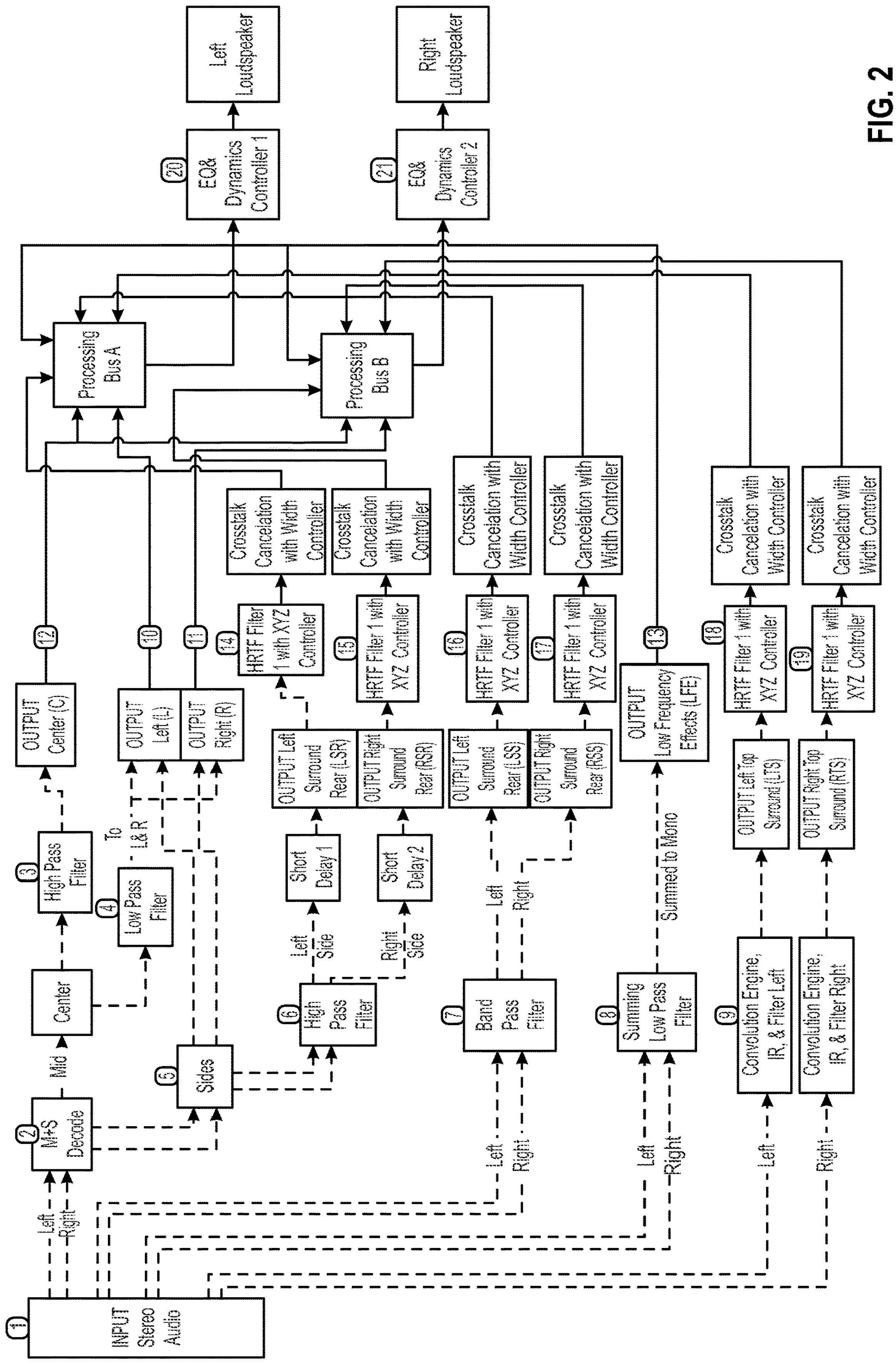
FIG. 2 shows the virtual UpMix process from a stereo input to UpMixed output to stereo loudspeakers.
Figure 3:
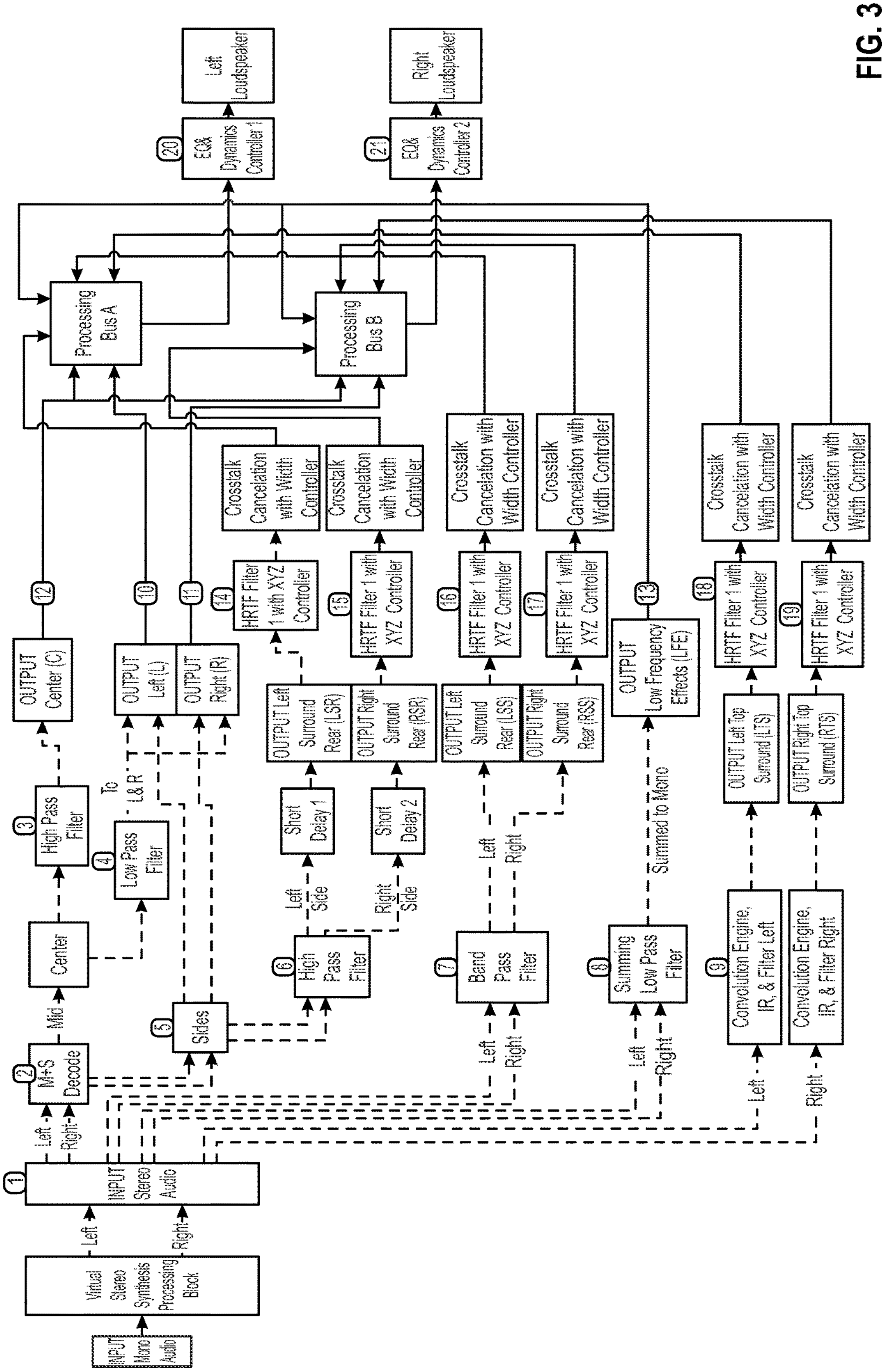
FIG. 3 shows the virtual UpMix process from a mono input to UpMixed output to stereo loudspeakers (Alternate Step 1A).
Figure 4:
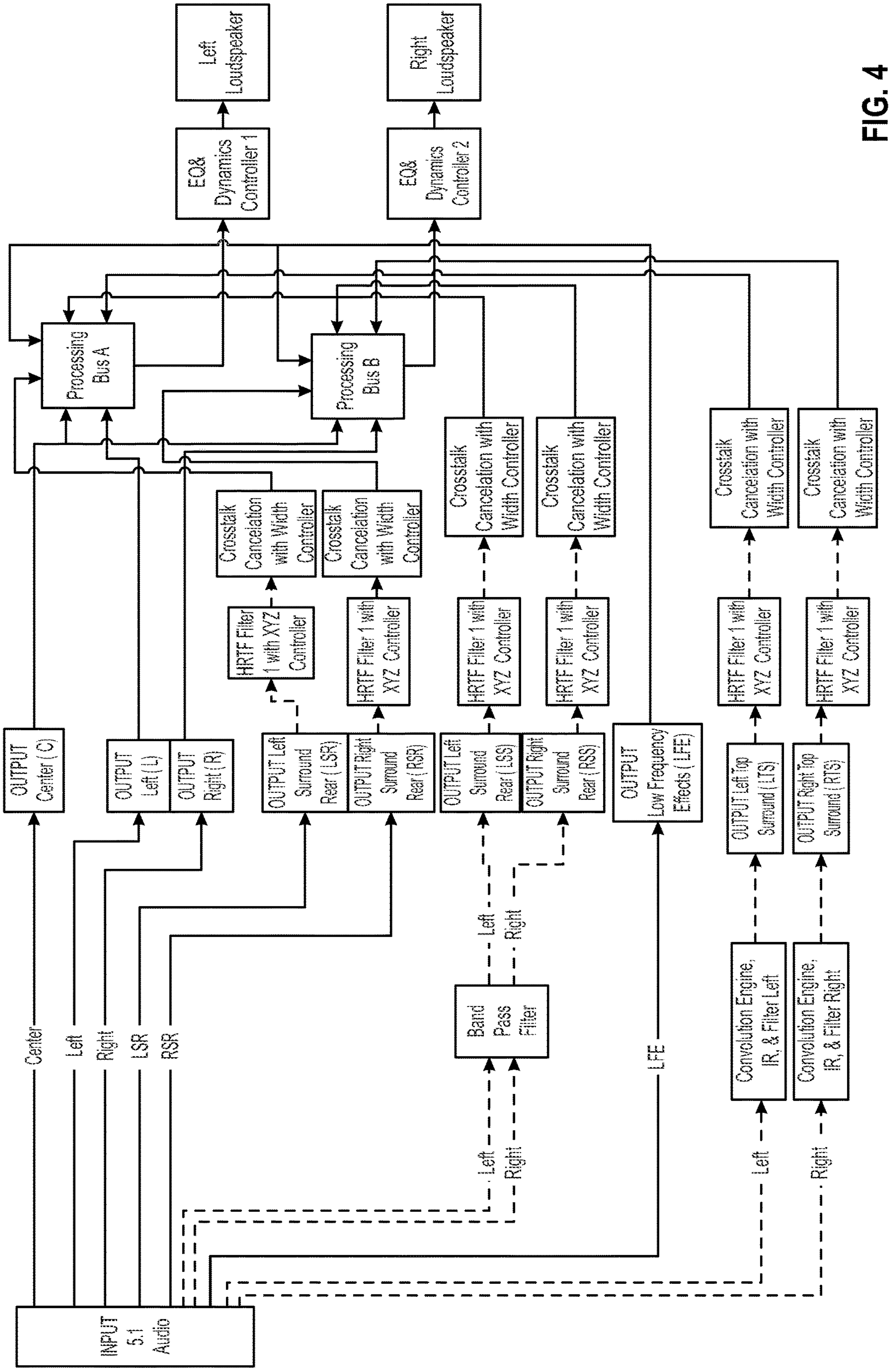
FIG. 4 shows the virtual UpMix process from a 5.1 input to UpMixed output to stereo loudspeakers (Alternate Step 1B).
Figure 5:
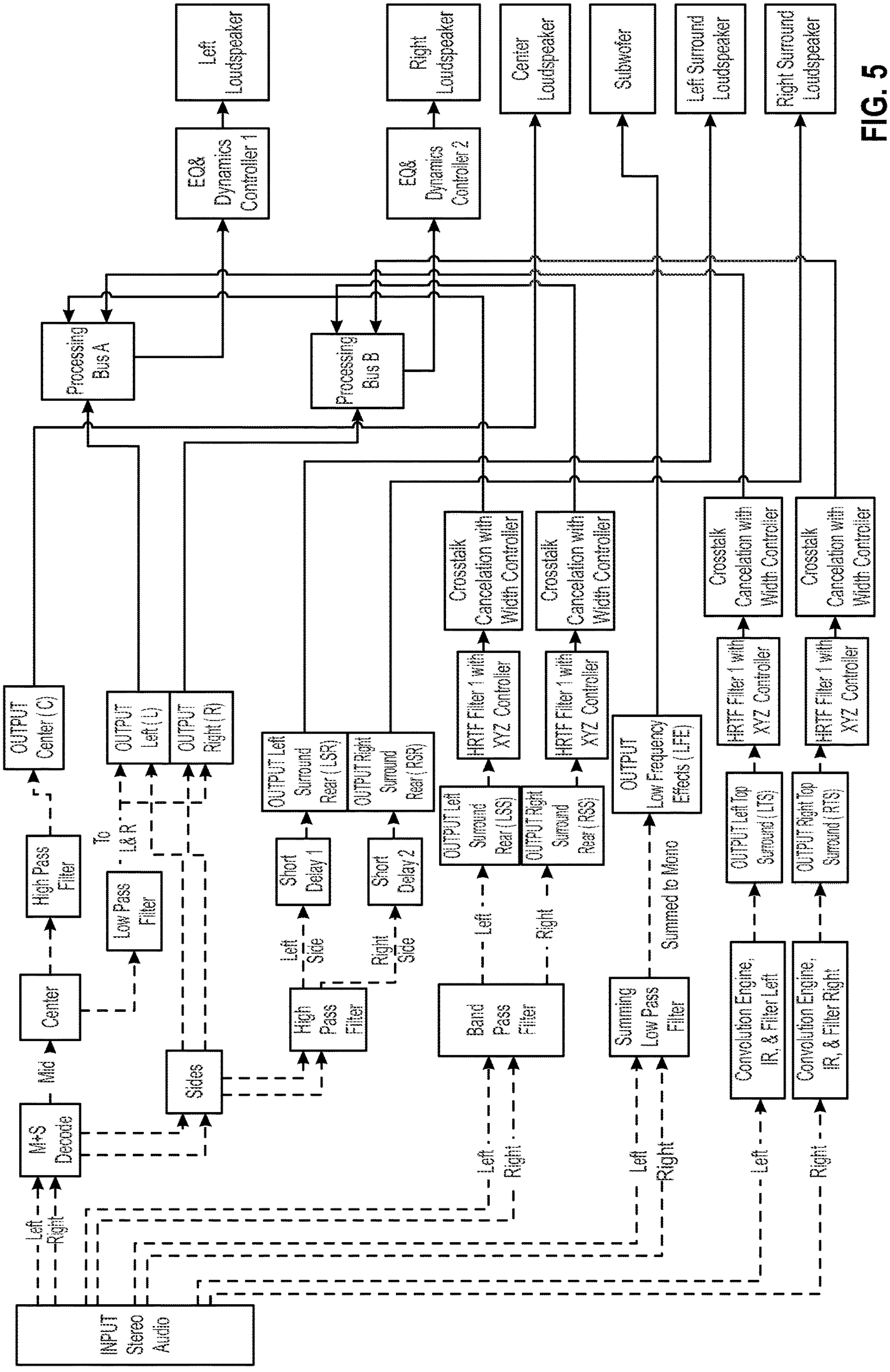
FIG. 5 shows the virtual UpMix process from a stereo input to UpMixed output to 5.1 loudspeakers (Additional Options 2).
Figure 6:
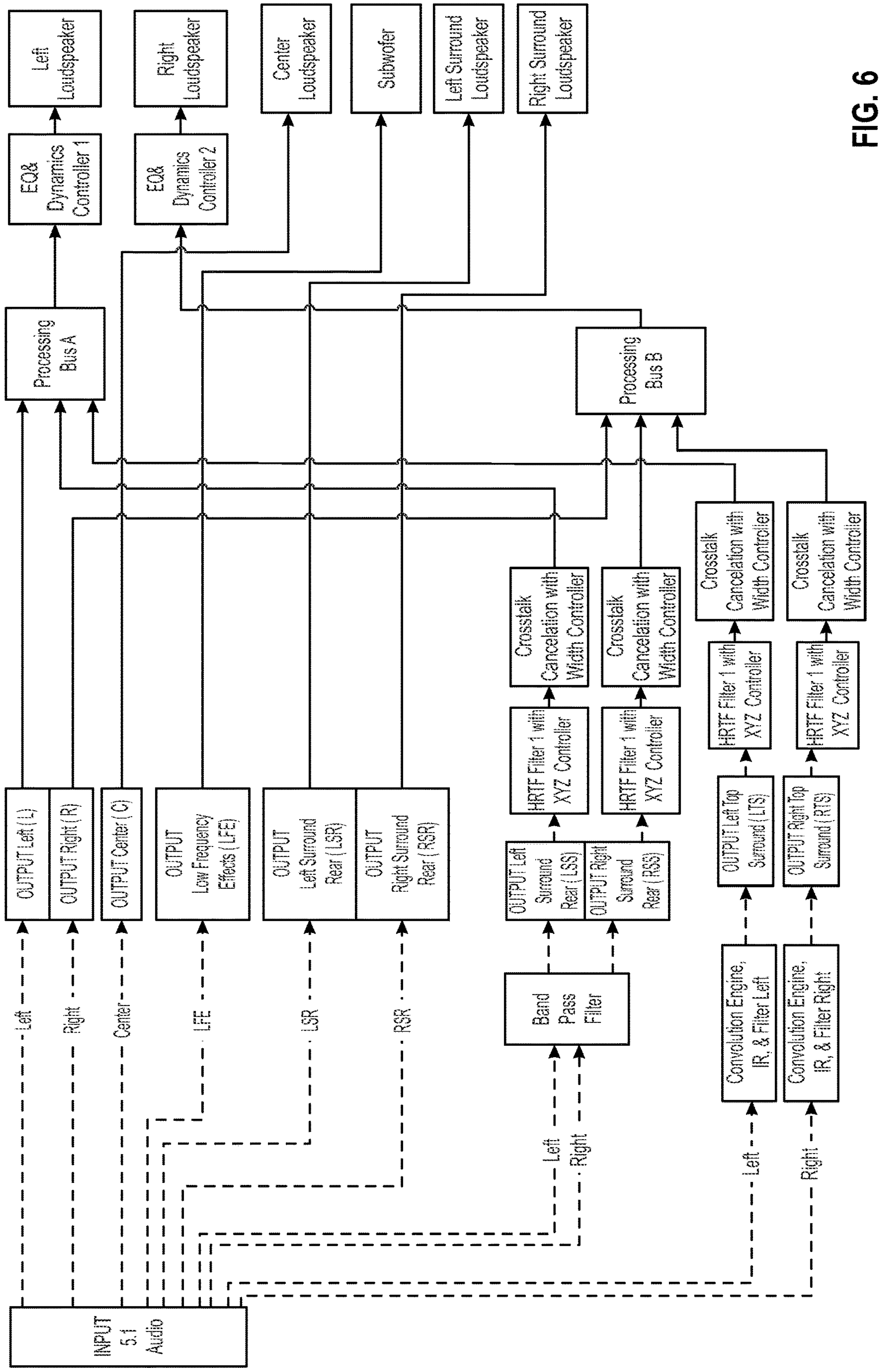
FIG. 6 shows the virtual UpMix process from a 5.1 input to UpMixed output to 5.1 loudspeakers (Additional Options 2).

The present invention relates generally to a virtual surround sound process for loudspeaker systems.

In its most complete and preferred version, the software is made up of the following executable steps: The present invention is a computerized process for creating an enhanced virtual surround sound playback for loudspeaker systems, using only a standard stereo audio source or file. This computer process is made up of the following executable steps:

- Step 1: A stereo audio source with "Left" and "Right" information is passed into the input of the virtualization software.
- Step 2: The stereo audio signal is passed through a Mid-Side decode processing block to extract center image information from the stereo sound-field.
- Step 3: The extracted center image information is processed with a High Pass filter to subtract low frequency information, and then routed to an output audio paths labeled "Center (C)".
- Step 4: The extracted center image information is duplicated, processed with a Low Pass filter to subtract mid and high frequency information, and then routed to output paths "Left (L)" and "Right (R)".
- Step 5: The Side information extracted from the Mid-Side decode processing block is routed to output paths "Left (L)" and "Right (R)".
- Step 6: A duplicate of the Side information extracted from the Mid-Side decode processing block is processed by a High Pass filter to remove low frequency information, and then split into a left side and a right side, where the left side is processed by an audio delay block set to a very short delay, less than 100 milliseconds, at which both left and right signals are then routed to output paths "Left Surround Rear (LSR)" and "Right Surround Rear (RSR)".
- Step 7: A duplicate of the Left and Right input audio source is created, processed by a Band Pass filter to extract both high and low frequencies, leaving only the middle frequencies present, at which the processed Left and Right duplicate signals are then routed to output paths labeled "Left Side Surround (LSS)" and "Right Side Surround (RSS)".
- Step 8: Another duplicate of the Left and Right input audio source is created, summed to create a single mono audio source, processed by a Low Pass filter to remove middle and high frequency information, and then routed to an output path labeled "Low Frequency Effects (LFE)"
- Step 9: Another duplicate of the Left and Right input audio source is created, split into left and right channels, and then each routed into a separate convolution engine, each processed by an impulse response with room reflections, processed by a filter for tonal equalization, and then routed to output paths labeled "Left Top Surround (LTS)" and "Right Top Surround (RTS)"
- Step 10: The (L) output path is connected to "Processing Bus A".
- Step 11: The (R) output path is connected to "Processing Bus B".
- Step 12: The (C) output path is connected to "Processing Bus A" and "Processing Bus B"
- Step 13: The (LFE) output path is connected to "Processing Bus A" and "Processing Bus B"
- Step 14: The (LSS) output path is connected to a convolution engine, processed by an HRTF filter with an externally controllable azimuth and elevation (impulse response), connected to crosstalk cancelation processing block with an externally controllable loudspeaker width, and then connected to "Processing Bus A".
- Step 15: The (RSS) output path is connected to a convolution engine, processed by an HRTF filter with an externally controllable azimuth and elevation (impulse response), connected to crosstalk cancelation processing block with an externally controllable loudspeaker width, and then connected to "Processing Bus B".
- Step 16: The (LSR) output path is connected to a convolution engine, processed by an HRTF filter with an externally controllable azimuth and elevation (impulse response), connected to crosstalk cancelation processing block with an externally controllable loudspeaker width, and then connected to "Processing Bus A".
- Step 17: The (RSR) output path is connected to a convolution engine, processed by an HRTF filter with an externally controllable azimuth and elevation (impulse response), connected to crosstalk cancelation processing block with an externally controllable loudspeaker width, and then connected to "Processing Bus B".
- Step 18: The (TSL) output path is connected to a convolution engine, processed by an HRTF filter with an externally controllable azimuth and elevation (impulse response), connected to crosstalk cancelation processing block with an externally controllable loudspeaker width, and then connected to "Processing Bus A".
- Step 19: The (TSR) output path is connected to a convolution engine, processed by an HRTF filter with an externally controllable azimuth and elevation (impulse response), connected to crosstalk cancelation processing block with an externally controllable loudspeaker width, and then connected to "Processing Bus B".
- Step 20: Processing Bus A is connected to an equalization and dynamic control processing block, and then connected to a Left Loudspeaker.
- Step 21: Processing Bus B is connected to an equalization and dynamic control processing block, and then connected to a Right Loudspeaker.

The present invention may also have one or more of the following optional executable steps:

- Alternate Step 1A: A mono input source can be used instead of a stereo input source, but will first be sent to a virtual stereo synthesis processing block where a virtualized stereo signal will be created before proceeding to Step 1.
- Alternate Step 1B: A multichannel surround sound input source such as 5.1, 7.1, 3.0, 4.0, or any other surround sound format can also be accepted as an input source, where by all following steps that derive new information from the L and R input channels of the multichannel surround sound input source will continue as already described, but any channels that are already present in the multichannel surround source will take precedence over and cancel out any of the virtualized versions of those channels. For example, if the input source is 5.1 and includes Left, Right, Center, LFE, LSR, and RSR channel information, then the Center channel from the input source will be used for the C output path instead of the virtualized C created from the Mid Side Decode process. The same rule applies for Left, Right, LFE, LSR, and RSR channels from the input source. In this example, only the newly created LSS, RSS, TLS, and TRS channels will be used from the virtualization process and be mixed in to the loudspeaker system along with the original multichannel source channel information. All HRTF and Crosstalk cancelation processes remain as described in the original steps.

Additional Options 1: equalization, gain control, dynamic control, and any other digital signal processing blocks can be added to any of the steps, and controlled by a user interface for loudspeaker optimization and customization.

Additional Options 2: Additional speakers can be added to the stereo loudspeaker system to create an expanded surround sound system. For example, a LSR, RSR, and LFE speaker can be added to the loudspeaker system, and if added, any source channel or virtualized channel path that is meant to be mapped to a virtualized path representing that speaker position will be routed directly to the additional speaker that has been added, bypassing all HRTF and crosstalk cancelation processing blocks. In this case, only the virtualized channels that do not have their own dedicated speakers will continue to be processed as described in the main processing steps 1-21, and Alternate Step 1A and Alternate Step 1B.

The methods and apparatus of the invention can be employed with a variety of sound formats in addition to the ones noted above, including but not limited to:

3.0, 4.0, 5.0, 5.1, 5.1.4, 6.0, 7.0, 7.1, 7.1.2, 7.1.4, 8.0, 9.0, 9.1.6, 10.2, 11.0, 11.1, 11.1.4, 22.2, for example.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A virtual surround sound process for loudspeaker systems comprising:

inputting a standard stereo audio source signal with a left information and a right information into a virtualization process and extracting information to produce plural spatial representation outputs;

connecting selected first ones of the plural spatial representation outputs to a first "Processing Bus A";

connecting selected second ones of the plural spatial representation outputs to a first "Processing Bus B";

connecting selected third ones of the plural spatial representation outputs to a "Processing Bus A" and "Processing Bus B";

connecting the "Processing Bus A" to an equalization and dynamic control processing block, and then connecting the output thereof to a first portion of a loudspeaker system; connecting the "Processing Bus B" to an equalization and dynamic control processing block, and then connecting the output thereof to a second portion of the loudspeaker system.

2. The virtual surround sound process for loudspeaker systems according to claim 1, wherein said first portion of a loudspeaker system comprises a first of a left or a right loudspeaker and said second portion of a loudspeaker system comprises a second of the left or the right loudspeaker.

3. The virtual surround sound process for loudspeaker systems according to claim 1, wherein said loudspeaker system comprises a system selected from the group consisting of a a 7.1, and a 7.1.2 speaker system.

4. The virtual surround sound process for loudspeaker systems according to claim 1, wherein said loudspeaker system comprises a system selected from the group consisting of any of the following channel counts: 3.0, a 4.0, a 5.0, a 5.1, a 5.1.4, a 6.0, a 7.0, a 7.1, a 7.1.2, a 7.1.4, a 8.0, a 9.0, a 9.1.6, a 10.2, a 11.0, a 11.1, a 11.1.4, and a 22.2 speaker system.

5. The virtual surround sound process for loudspeaker systems according to claim 1, further comprising connecting one or more of the spatial outputs to a convolution engine, processed by an HRTF filter with an externally controllable azimuth and elevation (impulse response), connected to a crosstalk cancelation processing block with a controllable loudspeaker width, and then connecting the output thereof to "Processing Bus A" or "Processing Bus B".

6. The virtual surround sound process for loudspeaker systems according to claim 1, wherein:

said extracting information to produce plural spatial representation outputs comprises producing a "Left (L)", a "Right (R)", "Center (C)", a "Left Surround Rear (LSR)", a "Right Surround Rear (RSR)", a "Left Side Surround (LSS)", a "Right Side Surround (RSS)", a "Low Frequency Effects (LFE)", a "Top Surround L (TSL)", and a "Top Surround R (TSR)", output path;

connecting the (L) output to a "Processing Bus A";

connecting the (R) output path to a "Processing Bus B";

connecting the (C) output path is connected to "Processing Bus A" and "Processing Bus B";

connecting the (LFE) output path to "Processing Bus A" and "Processing Bus B";

connecting the (LSR) output path to a convolution engine, processed by an HRTF filter with an externally controllable azimuth and elevation (impulse response), connected to a crosstalk cancelation processing block with a controllable loudspeaker width, and then connecting the output thereof to "Processing Bus A";

connecting the (RSR) output to a convolution engine, processed by an HRTF filter with an externally controllable azimuth and elevation (impulse response), connected to crosstalk cancelation processing block with a controllable loudspeaker width, and then connecting the output thereof to "Processing Bus B";

connecting the (LSS) output to a convolution engine, processed by an HRTF filter with an externally controllable azimuth and elevation (impulse response), connected to crosstalk cancelation processing block with a controllable loudspeaker width, and then connecting the output thereof to "Processing Bus A";

connecting the (RSS) output to a convolution engine, processed by an HRTF filter with an externally controllable azimuth and elevation (impulse response), connected to crosstalk cancelation processing block with a controllable loudspeaker width, and then connecting the output thereof to "Processing Bus B";

connecting the (TSL) output to a convolution engine, processed by an HRTF filter with a controllable azimuth and elevation (impulse response), connected to a crosstalk cancelation processing block with a controllable loudspeaker width, and then connecting the output thereof to "Processing Bus A";

connecting the (TSR) output path to a convolution engine, processed by an HRTF filter with a controllable azimuth and elevation (impulse response), connected to crosstalk cancelation processing block with a controllable loudspeaker width, and then connecting the output thereof to "Processing Bus B";

connecting the Processing Bus A to an equalization and dynamic control processing block, and then connecting the output thereof to a Left Loudspeaker;

connecting the Processing Bus B to an equalization and dynamic control processing block, and then connecting the output thereof to a Right Loudspeaker.

7. The virtual surround sound process for loudspeaker systems according to claim 6, wherein the L output is provided by:

extracting center image information from the stereo sound-source signal;

subtracting low frequency information from the extracted center image information and routing the result to a center audio path;

Mid-Side decode processing the extracted center image information with a low pass filter to extract mid and high frequency information and routing the result to a left and a right output path;

routing the Mid-Side decode processing output to the "Left (L)" output path.

8. The virtual surround sound process for loudspeaker systems according to claim 6, wherein the R output is provided by extracting center image information from the stereo sound-source signal;

subtracting low frequency information from the extracted center image information and routing the result to a center audio path;

Mid-Side decode processing the extracted center image information with a low pass filter to extract mid and high frequency information and routing the result to a left and a right output path;

routing the Mid-Side decode processing output to the "Right (R)" output path.

9. The virtual surround sound process for loudspeaker systems according to claim 6, wherein the LSR and RSR output is provided by:

extracting center image information from the stereo sound-source signal;

processing the extracted center image information with a High Pass filter to remove low frequency information, and then splitting the output of the high pass filter into a left side and a right side, where the left side is processed by an audio delay block set to a delay, less than 100 milliseconds, at which both left and right signals are then routed to output paths "Left Surround Rear (LSR)" and "Right Surround Rear (RSR)".

10. The virtual surround sound process for loudspeaker systems according to claim 6, wherein the "Left Side Surround (LSS)" and "Right Side Surround (RSS)" output is provided by:

extracting center image information from the stereo sound-source signal;

processing the Left and Right input audio source with a Band Pass filter to extract both high and low frequencies to produce processed Left and Right duplicate signals, leaving only the middle frequencies present, at which the processed Left and Right duplicate signals are then routed to output paths labeled "Left Side Surround (LSS)" and "Right Side Surround (RSS)".

11. A virtual surround sound process for loudspeaker systems comprising:

inputting a standard stereo audio source signal with a left information and a right information into a virtualization process;

extracting center image information from the stereo sound-source signal;

subtracting low frequency information from the extracted center image information and routing the result to a center audio path;

Mid-Side decode processing the extracted center image information with a low pass filter to extract mid and high frequency information and routing the result to a "Left (L)" and a "Right (R)" output path;

routing the Mid-Side decode processing output to the "Left (L)" and "Right (R)" output paths;

processing the Mid-Side decode processing output with a high pass filter to remove low frequency information, splitting the output thereof to a left side and a right side, processing the left side by an audio delay block to provide a delayed left side, and routing the delayed left side and right side to a left surround rear and a right surround rear output;

processing the left information and right information with a band pass filter to extract both high and low frequencies, leaving a left middle signal and a right middle signal with only middle frequencies present, at which the processed left middle signal and a right middle signal are then routed to "Left Side Surround (LSS)" and "Right Side Surround (RSS)" output paths;

summing the left information and right information to create a single mono audio source, processing the single mono audio source with a Low Pass filter to remove middle and high frequency information, and then routing to a "Low Frequency Effects (LFE)" output path;

connecting the (L) output to a "Processing Bus A";

connecting the (R) output path to a "Processing Bus B";

connecting a Center (C) output path is connected to "Processing Bus A" and "Processing Bus B"

connecting a "Low Frequency Effects (LFE)" output path to "Processing Bus A" and "Processing Bus B";

connecting a "Left Surround Rear (LSR)" output path to a convolution engine, processed by an HRTF filter with an externally controllable azimuth and elevation (impulse response), connected to a crosstalk cancelation processing block with a controllable loudspeaker width, and then connecting the output thereof to "Processing Bus A";

connecting a "Right Surround Rear (RSR)" output to a first convolution engine, processed by a first HRTF filter with an externally controllable azimuth and elevation (impulse response), connected to crosstalk cancelation processing block with an controllable loudspeaker width, and then connecting the output thereof to "Processing Bus B";

connecting the (LSS) output to a second convolution engine, processed by a second HRTF filter with an externally controllable azimuth and elevation (impulse response), connected to crosstalk cancelation processing block with a controllable loudspeaker width, and then connecting the output thereof to "Processing Bus A";

connecting the (RSS) output to a convolution engine, processed by an HRTF filter with an externally controllable azimuth and elevation (impulse response), connected to crosstalk cancelation processing block with a controllable loudspeaker width, and then connecting the output thereof to "Processing Bus B";

connecting the (TSL) output to a convolution engine, processed by an HRTF filter with a controllable azimuth and elevation (impulse response), connected to a crosstalk cancelation processing block with a controllable loudspeaker width, and then connecting the output thereof to "Processing Bus A";

connecting the (TSR) output path to a convolution engine, processed by an HRTF filter with a controllable azimuth and elevation (impulse response), connected to crosstalk cancelation processing block with a controllable loudspeaker width, and then connecting the output thereof to "Processing Bus B";

connecting the Processing Bus A to an equalization and dynamic control processing block, and then connecting the output thereof to a Left Loudspeaker;

connecting the Processing Bus B to an equalization and dynamic control processing block, and then connecting the output thereof to a Right Loudspeaker.

12. A virtual surround sound process for loudspeaker systems comprising:

inputting a standard stereo audio source signal with a left information and a right information into a virtualization process;

extracting center image information from the stereo sound-source signal;

subtracting low frequency information from the extracted center image information and routing the result to a center (C) audio path;

Mid-Side decode processing the extracted center image information with a low pass filter to extract mid and high frequency information and routing the result to a left and a right output path;

routing the Mid-Side decode processing output to the "Left (L)" and "Right (R)" output paths;

processing the mid side decode processing output with a high pass filter to remove low frequency information, splitting the output thereof to a left side and a right side, processing the left side by an audio delay block to provide a delay, and routing the delayed left side and right side to a left surround rear (LSR) and a right surround rear (RSR) output;

summing the left information and right information to create a single mono audio source, processing the single mono audio source with a Low Pass filter to remove middle and high frequency information, and then routing to a "Low Frequency Effects (LFE)" output path;

all output paths L, R, C, LSR, RSR, and LFE are now available to be routed to individual speakers or channel processing paths.

13. A virtual surround sound process for loudspeaker systems according to claim 12, further comprising:

processing the left information and right information with a band pass filter to extract both high and low frequencies, leaving only middle frequencies present, at which the processed Left and Right signals are then routed to "Left Side Surround (LSS)" and "Right Side Surround (RSS)" output paths;

wherein output paths L, R, C, LSR, RSR, LSS, RSS, and LFE, are now available to be routed to individual speakers or channel processing paths.

14. A virtual surround sound process for loudspeaker systems according to claim 12, further comprising:

Processing the Left and Right input audio source, split into left and right channels, and then each routed into a separate convolution engine, each processed by an impulse response with room reflections, processed by a filter for tonal equalization, and then routed to output paths labeled "Left Top Surround (LTS)" and "Right Top Surround (RTS)";

Wherein output paths L, R, C, LSR, RSR, LSS, RSS, LFE, LTS, and RTS are now available to be routed to individual speakers or channel processing paths.

* * * * *